United States Patent [19]

Hofbauer et al.

[11] Patent Number: 4,551,051

[45] Date of Patent: Nov. 5, 1985

[54] APPARATUS FOR CHARGING A ROTARY KILN WITH PNEUMATIC TIRES

[75] Inventors: Edwin Hofbauer, Sulz; Peter Lechner; Heribert Exler, both of Kaltenleutgeben, all of Austria

[73] Assignee: Voest-Alpine Aktiengesellschaft, Linz, Austria

[21] Appl. No.: 533,308

[22] Filed: Sep. 19, 1983

[30] Foreign Application Priority Data

Oct. 15, 1982 [AT] Austria ................................ 3792/82

[51] Int. Cl.[4] ........................ F23K 3/00; G01G 13/00

[52] U.S. Cl. ...................................... 414/21; 414/172; 414/199; 414/207; 414/208; 294/88; 294/86.4; 193/34; 110/246

[58] Field of Search ............... 414/149, 160, 167, 172, 414/199, 207, 208, 21; 432/109, 117; 110/101 CD, 246, 248, 255; 193/34; 294/86 R, 88

[56] References Cited

U.S. PATENT DOCUMENTS

| | | | |
|---|---|---|---|
| 1,021,649 | 3/1912 | Wodarra | 193/34 X |
| 3,499,557 | 3/1970 | Walzel | 414/208 |
| 4,339,998 | 7/1982 | Finch | 110/248 X |
| 4,442,825 | 4/1984 | Waldau | 110/101 CD X |
| 4,482,280 | 11/1984 | Füssl et al. | 414/199 X |

FOREIGN PATENT DOCUMENTS

| | | | |
|---|---|---|---|
| 1063516 | 8/1959 | Fed. Rep. of Germany | 414/199 |
| 2658371 | 7/1978 | Fed. Rep. of Germany | . |

*Primary Examiner*—Joseph E. Valenza
*Assistant Examiner*—David A. Bucci
*Attorney, Agent, or Firm*—Kurt Kelman

[57] ABSTRACT

A rotary kiln is charged with pneumatic tires by a lock chamber which carries two gates adapted to be opened in alternation. To ensure a desirable charging operation, the lock chamber provides a runway downwardly inclined towards the kiln inlet and having a length which is at least twice the tire diameter. The gate at the receiving end of the lock chamber is provided with a tire holder for holding each tire in a position for rolling on the runway. The tire holder comprises a gripping device having two gripping jaws operable to move in mutually opposite directions and engageable with the side wall of a pneumatic tire. The gripping jaws are mounted to be adjustable in a direction parallel to the runway and transversely to the direction of travel of the tire on the runway.

5 Claims, 2 Drawing Figures

APPARATUS FOR CHARGING A ROTARY KILN WITH PNEUMATIC TIRES

Figure 1:
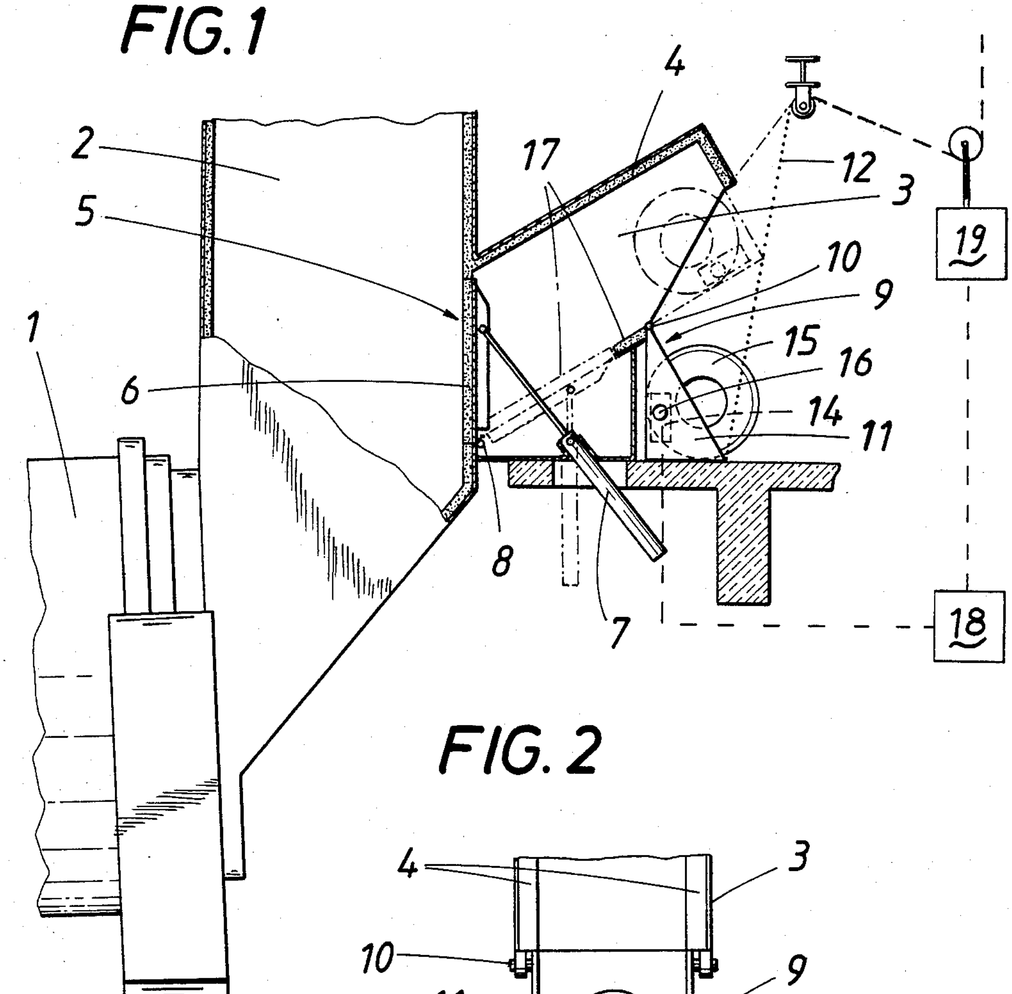

This invention relates to apparatus for charging a rotary kiln with pneumatic tires, comprising a lock chamber structure, which precedes an end inlet of the kiln, two gates, which are carried by said lock chamber structure at its kiln end, respectively, and are adapted to be opened in alternation.

It is known to charge pneumatic tires as additional fuel into a rotary kiln for burning, e.g., a precalcined raw materials mixture to form cement clinker. The tires should be charged to such kiln in a simple manner and without an in-leak of air. To meet that requirement it has already been proposed to attach to the end inlet of the kiln a lock chamber structure which at its receiving end and at its kiln end is closed by respective sliding gates. When the kiln end gate is closed, the gate at the receiving end can be opened and a tire can then be fed into the lock chamber. When the gate at the receiving end has then been closed, the kiln end gate can be opened so that the tire enters the kiln, which remains gastightly closed during that operation. That known apparatus has the disadvantage that the pneumatic tires cannot be deposited in a predetermined region of the kiln so that the desired burning conditions cannot readily be ensured. It is also difficult to ensure a uniform supply of fuel through the lock chamber because the pneumatic tires may differ in size.

It is known from Laid-open German Application No. 26 58 371 that a pyrolysis chamber can be charged with pneumatic tires, which are introduced in an upright orientation into a lock chamber structure having an inclined floor so that when the hinged gate connecting the lock chamber to the pyrolysis chamber has been opened the tires can roll on the inclined floor into the pyrolysis chamber. In that arrangement the tires are not held in a rolling position in the lock chamber but lean against the side walls of the lock chamber structure so that the movement of the tires will be impeded. Besides, the tires are only gradually released as the hinged gate leading into the pyrolysis chamber is opened. For this reason said known charging apparatus can be used only to deliver the tires into a space which directly adjoins the lock chamber. The tires cannot be deposited at a distance from the lock chamber although this would be desirable in a rotary kiln charged with pneumatic tires.

It is an object of the invention so to improve apparatus of the kind described first hereinbefore, which serves to charge a rotary kiln with pneumatic tires, that the charged tires will reliably be deposited in a predetermined region of the kiln and the rotary kiln is uniformly supplied with fuel.

This object is accomplished in accordance with the invention in that the lock chamber structure constitutes a runway, which is downwardly inclined toward the kiln inlet and serves to convey the pneumatic tires and has a length which is at least twice the diameter of the tire, and the gate receiving end of the lock chamber structure is provided on that side which faces the lock chamber with a tire holder for holding each pneumatic tire in a rolling position in which it is aligned with the runway, said tire holder consisting of a gripping device comprising two gripping jaws, which are operable to move in mutually opposite senses into and out of engagement with the side walls of the pneumatic tires and are mounted to be adjustable in a direction which is parallel to the runway and transverse to the direction of travel of the tires on the runway.

Owing to the provision of a runway which has a length of at least twice the tire diameter and of a special tire holder adjacent to the gate provided at the receiving end, the tires can be accelerated to an adequate velocity at the delivery end of the runway so that tires which have left the runway will continue to roll into the rotary kiln over an adequate distance. When a tire has been released by the tire holder, the acceleration of that tire cannot be impeded by the gate at the kiln end of the lock chamber because that gate has been opened before the release of the tire and does not constitute means for retaining a tire. The length of the path for acceleration and its inclination and its orientation relative to the rotary kiln determine the distance over which the tire will be charged into the kiln and said distance can be adjusted as desired by a control of said parameters.

The measures proposed by the invention do not only ensure a simple delivery of the tire to selected regions of the kiln but permit also a more accurate control of the fuel rate because the tire holder can release the tire at a selected time when the gate connected to the kiln is opened. For this reason the intervals of time between the charging of successive tires can be controlled more easily. It is seen that all requirements for a uniform feeding of fuel to a rotary kiln have been met.

Because the tire holder consists of gripping jaws which are engageable with the tire, the tire which has been introduced into the gripping device when the gate at the receiving end is open will be adjusted to a rolling position on the runway when the gripping jaws are properly actuated. As the gate is closed, the tire is introduced into the lock chamber together with the gate so that the provision of the tire holder at the gate permits a very simple charging of the tire.

A uniform supply of fuel can be ensured in spite of the charging of different tires if the tire holder is actuated by a timing control in dependence on the weight of the tire. A longer interval of time may be permitted to elapse until the charging of the next following tire after the charging of a large tire and a shorter interval of time may be permitted to elapse after the charging of a small tire. It is known to control the charging of pneumatic tires in dependence on their weight but the control of the invervals of time between the charging of successive tires affords important advantages over the known control of the number of tires because in the former case the rotary kiln can be charged with one tire at a time.

The tire weight is generally unknown and must be measured before or during the charging of a tire if a uniform charging of the rotary kiln is desired. For this purpose the gate provided with the tire holder is desirably connected to a weighing apparatus, which is connected to the timing control. In that case the weight of each tire can be indicated by the weighing device to the timing control so that the latter can be released in accordance with the desired time function.

The gate provided with the tire holder may be of any of various types. A particularly simple structure will be obtained if the gate provided with the tire holder consists of a member which is hinged to the lock chamber structure and can be swung away from and to the lock chamber. When the hinged gate has been swung away from the lock chamber, that side of the gate which normally faces the lock chamber will be freely accessible so that each vehicle tire can be mounted on the tire holder without difficulty.

If the gate which is provided at the kiln end of the lock chamber consists of a member which is hinged on an axis disposed adjacent to the runway and said gate can be opened by being swung down to a position in which said gate constitutes part of the runway, then the gastight seal between the kiln inlet and the lock chamber as well as a trouble free transfer of the tires rolling on the runway into the kiln can be ensured because the sealing surfaces for the kiln end gate do not obstruct the rolling of the tires on the runway.

Figure 2:
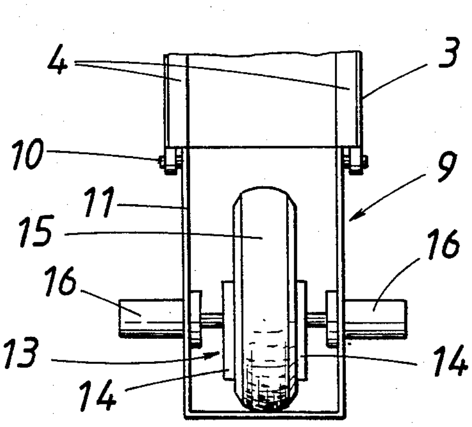

The subject matter of the invention is shown by way of example on the drawing, in which FIG. 1 is a vertical sectional view showing apparatus according to the invention for charging a rotary kiln with pneumatic tires and FIG. 2 is an enlarged end elevation showing the gate provided at the receiving end of the lock chamber of a charging apparatus according to the invention when that gate is open.

In accordance with FIG. 1, apparatus for charging a rotary kiln 1 comprises a lock chamber structure 3, which is connected to the end inlet 2 of the kiln and provided with a refractory lining 4. The passage between the kiln inlet 2 and the interior of the lock chamber structure 3 is provided with a gate 5, which comprises a hinged plate 6, which can be swung down to an open position about a lower hinge 8 by an actuating cylinder 7. That open position is indicated in dash-dot lines. Another gate 9 is provided at the receiving end of the lock chamber structure 3 and consists of a hinged plate 11, which is pivotally movable away from the lock chamber structure 3 about an axis 10. By means of a rope or chain drive 12, the hinged plate 11 is movable between an open position, shown in solid lines and a closed position, shown in dash-dot lines. The gate 9 at the receiving end is provided with a tire holder 13, which consists of a gripping device having two gripping jaws 14, which are operable to move in mutually opposite directions and can be forced from opposite sides against the side walls of a pneumatic tire 15 which has been delivered to the tire holder 13. Because the gripping jaws 14 are moved in mutally opposite directions by means of cylinders 16, each tire 15 delivered to the holder 13 will be aligned with the vertical longitudinal plane of the hinged plate 11, i.e., with the lock chamber 3, and will be retained in the aligned position so that when the gate 9 at the receiving end has been closed the pneumatic tire 15 will be held in the interior of the lock chamber structure 3 in a position for rolling.

The floor of the lock chamber structure 3 is downwardly inclined toward the kiln inlet 2 at an angle of about 30° from the horizontal so that said floor constitutes a runway 17, which leads to the kiln inlet 2 and on which each tire 15 can roll into the rotary kiln 1 when the kiln end valve 5 has been opened and the tire has been released by the tire holder. To permit a charging of each tire 15 to a desired region of the kiln 1, the runway must be so long that each tire will reliably leave the runway 17 at an adequate velocity. In practice the length of the runway 17 must be at least twice the tire diameter of the largest tire which can be charged by the charging apparatus so that that tire will also leave the runway 17 at an adequate terminal velocity.

The hinged plate 6 of the gate 5 at the kiln end of the lock chamber structure 3 may constitute part of the runway when that gate 5 has been swung by means of the actuating cylinder 7 to the open position shown in dash-dot lines. When the gate 5 is in that open position, the tire holder 13 can be actuated by the cylinders 16 to release the tire 15 previously held by the gripping jaws 14 so that that tire will then roll on the runway 17 through the kiln inlet into the rotary kiln 1. The region in which the charged tires will be deposited in the rotary kiln 1 will depend on the length and inclination of the runway 17 and on its orientation relative to the rotary kiln and can be varied by an alteration of these parameters. The rotation of the kiln must obviously be taken into account too.

To ensure a uniform feeding of the kiln and a uniform combustion, the different combustion times of tires differing in size must be taken into account. For this purpose the cylinders 16 of the tire holder 13 may be controlled by a timing control 18, which will in dependence on the weight of a tire which has just been charged will determine the time which elapses until the next following tire is charged. If the gate 9 provided with the tire holder 13 is connected to a weighing mechanism 19—this can be effected in a simple manner by means of the rope or chain drive 12—then the weight of each tire 15 can be determined and indicated to the timing control so that the interval of time between the charging of successive tires will be controlled in dependence on the time required for the combustion of the tire. Because the charging is time-controlled, each pneumatic tire 15 must be delivered to the gate 9 at the receiving end during the combustion of the preceding tire. This can be effected without difficulty so that the operation of the charging apparatus can be automated to a high degree.

What is claimed is:

1. In apparatus for charging pneumatic tires up to a predetermined maximum diameter to a rotary kiln having an end inlet, comprising a lock chamber structure having a kiln end adapted to be connected to said end inlet and a receiving end opposite to said kiln end, said lock chamber structure comprising a kiln end gate and a receiving end gate at said kiln end and said receiving end, respectively, and gate-actuating means for opening said kiln end gate and said receiving end gate in alternation, the improvement residing in that said lock chamber structure has a runway which has a rear end disposed in the interior of said lock chamber structure adjacent to said receiving end and is downwardly inclined in the direction from said rear end to said kiln end when said kiln end gate is open and said receiving end gate is closed has a length which is at least twice said maximum diameter, said receiving end gate carries a tire holder which is arranged to be disposed in the interior of said lock chamber structure when said receiving end gate is closed, said tire holder comprises a gripping device for holding a tire at said rear end of said runway in a position for rolling on said runway, said gripping device comprises two gripping jaws, which are mounted to be movable in a direction which is parallel to said runway and transverse to the longitudinal direction of said runway, and tire holder actuating means are provided for moving said gripping jaws in mutually opposite directions into and out of engagement with the side walls of a tire disposed between said gripping jaws.

2. The improvement set forth in claim 1, wherein timing control means are provided for controlling said tire holder actuating means to move said gripping jaws out of engagement with the side walls of a tire disposed between said gripping jaws when a time which depends on the weight of said tire has expired since the gripping jaws have been moved out of engagement with the side walls of the preceding tire.

3. The improvement set forth in claim 2, wherein weighing means for weighing a tire held by said gripping device is operatively connected to said receiving end gate and to said timing control means and said timing control means are operable to determine said time in dependence on the weight determined by said weighing means.

4. The improvement set forth in claim 1, wherein said receiving end gate comprises a hinged plate which is pivotally movable from said receiving end in an outward direction to a position in which said receiving end is open and said tire holder is accessible from the outside of said lock chamber structure.

5. The improvement set forth in claim 1, wherein said kiln end gate comprises a hinged plate which is pivotally movable about an axis disposed adjacent to said runway from said kiln end into the interior of said lock chamber structure to a position in which said kiln end gate is open and said hinged plate constitutes part of said runway.

* * * * *